US009736123B2

United States Patent
Xu et al.

(10) Patent No.: US 9,736,123 B2
(45) Date of Patent: Aug. 15, 2017

(54) SPRAY ARM ASSEMBLIES FOR DISHWASHER APPLIANCES

(71) Applicant: General Electric Company, Schenectady, NY (US)

(72) Inventors: Hanping Xu, Louisville, KY (US); Joel Charles Boyer, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 16 days.

(21) Appl. No.: 14/596,264

(22) Filed: Jan. 14, 2015

(65) Prior Publication Data

US 2016/0198928 A1 Jul. 14, 2016

(51) Int. Cl.
| | |
|---|---|
| *H04L 29/06* | (2006.01) |
| *A47L 15/23* | (2006.01) |
| *H04L 9/08* | (2006.01) |
| *H04L 9/32* | (2006.01) |
| *A47L 15/42* | (2006.01) |

(52) U.S. Cl.
CPC .......... *H04L 63/0471* (2013.01); *A47L 15/23* (2013.01); *H04L 9/0825* (2013.01); *H04L 9/0861* (2013.01); *H04L 9/3247* (2013.01); *H04L 63/0442* (2013.01); *A47L 15/4282* (2013.01); *H04L 2463/062* (2013.01)

(58) Field of Classification Search
CPC .. A47L 15/23; A47L 15/4282; H04L 63/0471; H04L 9/0825; H04L 9/3247; H04L 63/0442; H04L 9/0861; H04L 2463/062
USPC ........................ 239/225.1, 227; 1/225.1, 227
See application file for complete search history.

(56) References Cited

U.S. PATENT DOCUMENTS

| | | | | | |
|---|---|---|---|---|---|
| 1,737,257 | A | * | 11/1929 | Merseles ................. | A47L 15/23 239/245 |
| 3,361,361 | A | * | 1/1968 | Schutte ................... | A47L 15/23 134/179 |
| 4,175,575 | A | * | 11/1979 | Cushing .................. | A47L 15/23 134/176 |
| 4,708,290 | A | * | 11/1987 | Osmond ................. | B05B 3/008 239/227 |

(Continued)

FOREIGN PATENT DOCUMENTS

WO    WO 2011/154471 A1    12/2011

*Primary Examiner* — Arthur O Hall
*Assistant Examiner* — Joel Zhou
(74) *Attorney, Agent, or Firm* — Dority & Manning, P.A.

(57) ABSTRACT

Spray arm assemblies for dishwasher appliances are provided. A spray arm assembly includes a first spray arm. The first spray arm includes an arm member, the arm member defining an interior and a plurality of apertures in fluid communication with the interior. The arm member further extends along and is rotatable about a longitudinal axis. The spray arm assembly further includes a central housing defining and rotatable about a central axis, the central axis generally perpendicular to the longitudinal axis. In some embodiments, the spray arm assembly further includes a bevel drive assembly disposed within the central housing. The bevel drive assembly is configured to rotate the arm member about the longitudinal axis when the central housing rotates about the central axis. The bevel drive assembly includes a drive member, an axle member, and an idler member, the axle member mounted to the arm member.

14 Claims, 6 Drawing Sheets

(56) References Cited

U.S. PATENT DOCUMENTS

2006/0278258 A1 12/2006 Kara et al.
2012/0279536 A1 11/2012 Adams et al.

\* cited by examiner

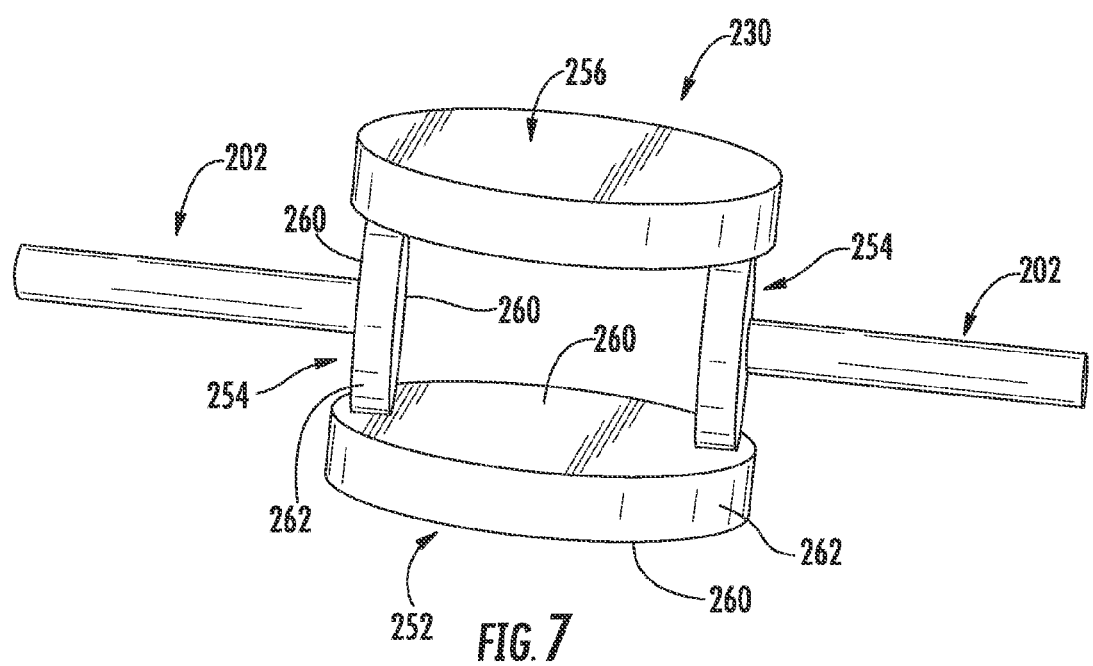

SPRAY ARM ASSEMBLIES FOR DISHWASHER APPLIANCES

FIELD OF THE INVENTION

The present disclosure relates generally to dishwasher appliances, and more particularly to improved spray arm assemblies for dishwasher appliances.

BACKGROUND OF THE INVENTION

Dishwasher appliances generally include a tub that defines a wash compartment. Rack assemblies can be mounted within the wash compartment of the tub for receipt of articles for washing. During wash and rinse cycles, spray assemblies within the wash compartment can apply or direct wash fluid (e.g. various combinations of water and detergent along with optional additives) towards articles disposed within the rack assemblies in order to clean such articles.

Multiple spray assemblies can be provided including e.g., a lower spray arm assembly mounted to the tub at a bottom of the wash compartment, a mid-level spray arm assembly mounted to one of the rack assemblies, and/or an upper spray assembly mounted to the tub at a top of the wash compartment. Other configurations may be used as well.

One limitation of many currently known spray arm assemblies is the geometry of the spray arm assemblies relative to the geometry of the dishwasher appliance interior. Most known spray arm assemblies utilize a generally circular geometry. For example, an arm of a spray arm assembly may rotate in a circle, and jets or apertures defined in the arm may emit wash fluid from the arm in this circular pattern. Each jet emits fluid in a constant direction from the associated arm during rotation, so that the locations reached by the wash fluid are predictable and limited. Further, the cross-sectional interior geometry of most currently known dishwasher appliances is square or rectangular. Accordingly, the corners of such dishwasher appliance, and the articles located therein, may not be sufficiently reached by wash fluid. These limitations can result in articles not being properly cleaned during operation of the dishwasher appliance.

Accordingly, improved spray arm assemblies and associated dishwasher appliances are desired in the art. In particular, improved spray arm assembly designs which increase the coverage of the wash fluid emitted therefrom would be advantageous.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a spray arm assembly for a dishwasher appliance is provided. The spray arm assembly includes a first spray arm. The first spray arm includes an arm member, the arm member defining an interior and a plurality of apertures in fluid communication with the interior. The arm member further extends along and is rotatable about a longitudinal axis. The spray arm assembly further includes a central housing defining and rotatable about a central axis, the central axis generally perpendicular to the longitudinal axis. The spray arm assembly further includes a bevel drive assembly disposed within the central housing. The bevel drive assembly is configured to rotate the arm member about the longitudinal axis when the central housing rotates about the central axis. The bevel drive assembly includes a drive member, an axle member, and an idler member, the axle member mounted to the arm member.

In accordance with another embodiment of the present disclosure, a spray arm assembly for a dishwasher appliance is provided. The spray arm assembly includes a first spray arm. The first spray arm includes an arm member, the arm member defining an interior and a plurality of apertures in fluid communication with the interior. The arm member further extends along and is rotatable about a longitudinal axis. The spray arm assembly further includes a central housing defining and rotatable about a central axis, the central axis generally perpendicular to the longitudinal axis. The spray arm assembly further includes a roller drive assembly disposed within the central housing. The roller drive assembly is configured to rotate the arm member about the longitudinal axis when the central housing rotates about the central axis. The roller drive assembly includes a drive roller, an axle roller, and an idler roller, the axle roller mounted to the arm member and oriented generally perpendicularly to the drive roller and the idler roller.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 7 is a perspective schematic view of a drive assembly for a spray arm assembly in accordance with yet another embodiment of the present disclosure.

DETAILED DESCRIPTION OF THE INVENTION

Figure 1:
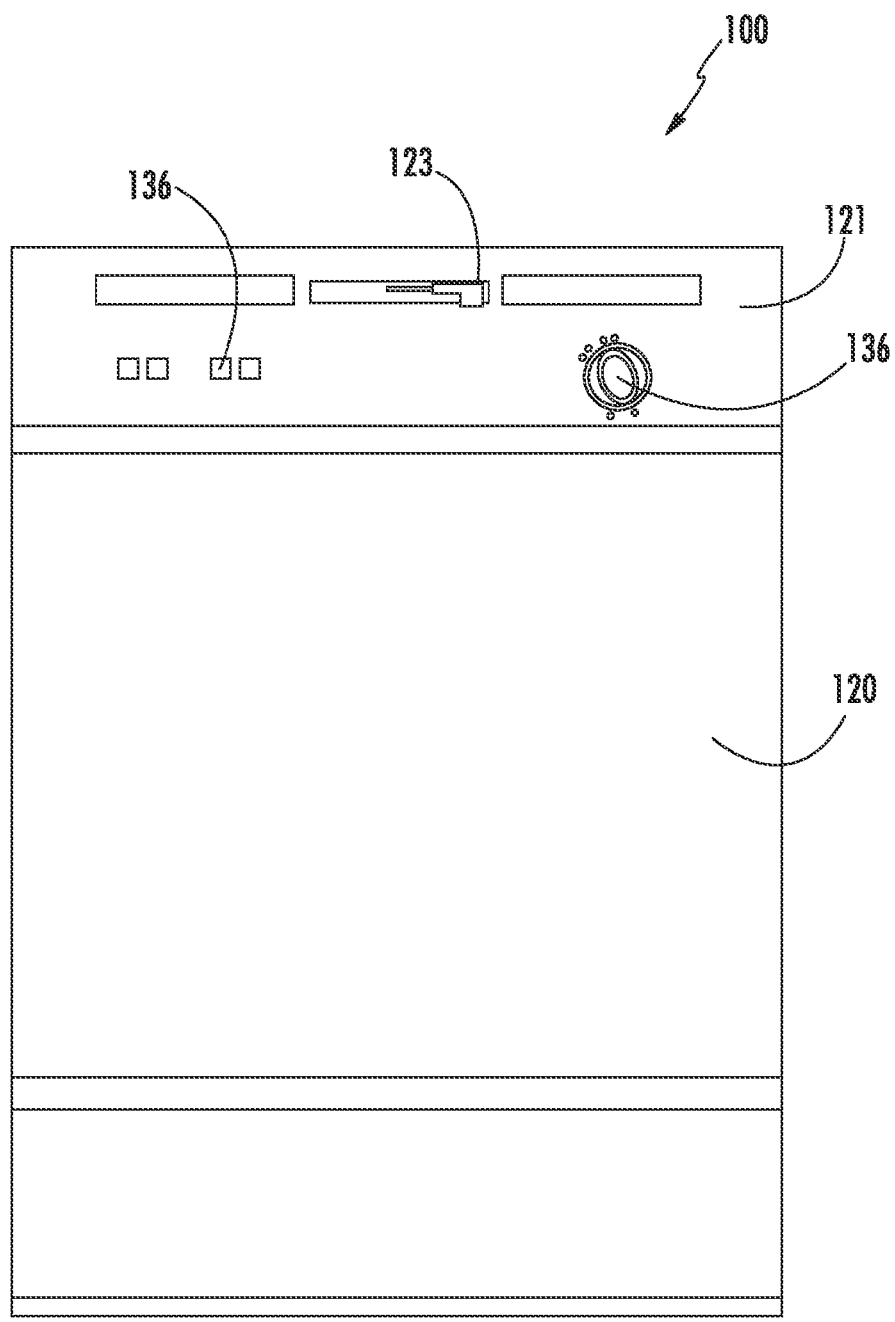
FIG. 1 provides a front view of a dishwasher appliance in accordance with one embodiment of the present disclosure.

Reference now will be made in detail to embodiments of the invention, one or more examples of which are illustrated in the drawings. Each example is provided by way of explanation of the invention, not limitation of the invention.

In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "article" may refer to but need not be limited to dishes, pots, pans, silverware, and other cooking utensils and items that can be cleaned in a dishwashing appliance. The term "wash cycle" is intended to refer to one or more periods of time during which a dishwashing appliance operates while containing the articles to be washed and uses a detergent and water, preferably with agitation, to e.g., remove soil particles including food and other undesirable elements from the articles. The term "rinse cycle" is intended to refer to one or more periods of time in which the dishwashing appliance operates to remove residual soil, detergents, and other undesirable elements that were retained by the articles after completion of the wash cycle. The term "wash fluid" refers to a liquid used for washing and/or rinsing the articles and is typically made up of water that may include other additives such as detergent or other treatments.

Figure 2:
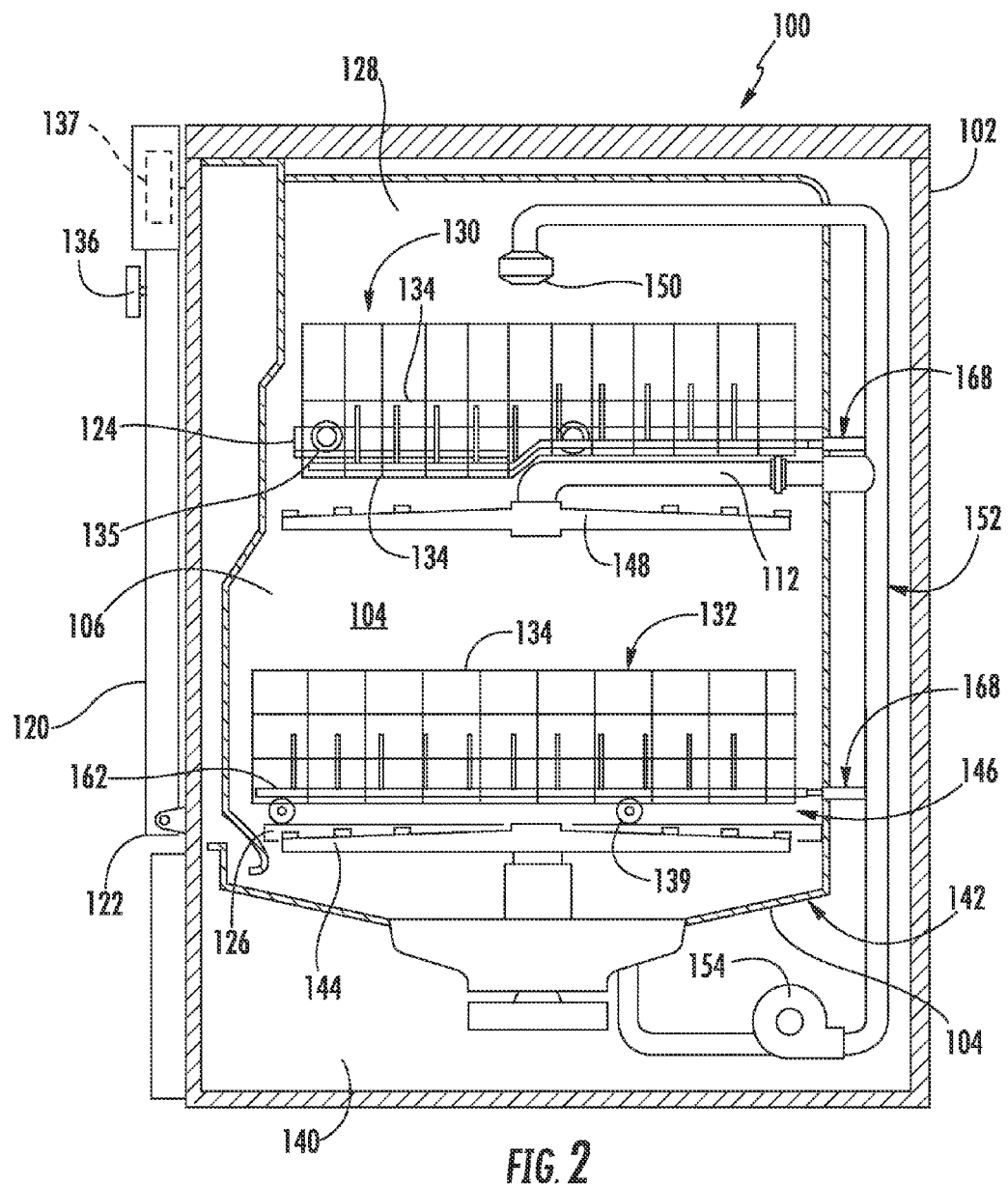
FIG. 2 is a side cross-sectional view of a dishwasher appliance in accordance with one embodiment of the present disclosure.
Figure 3:
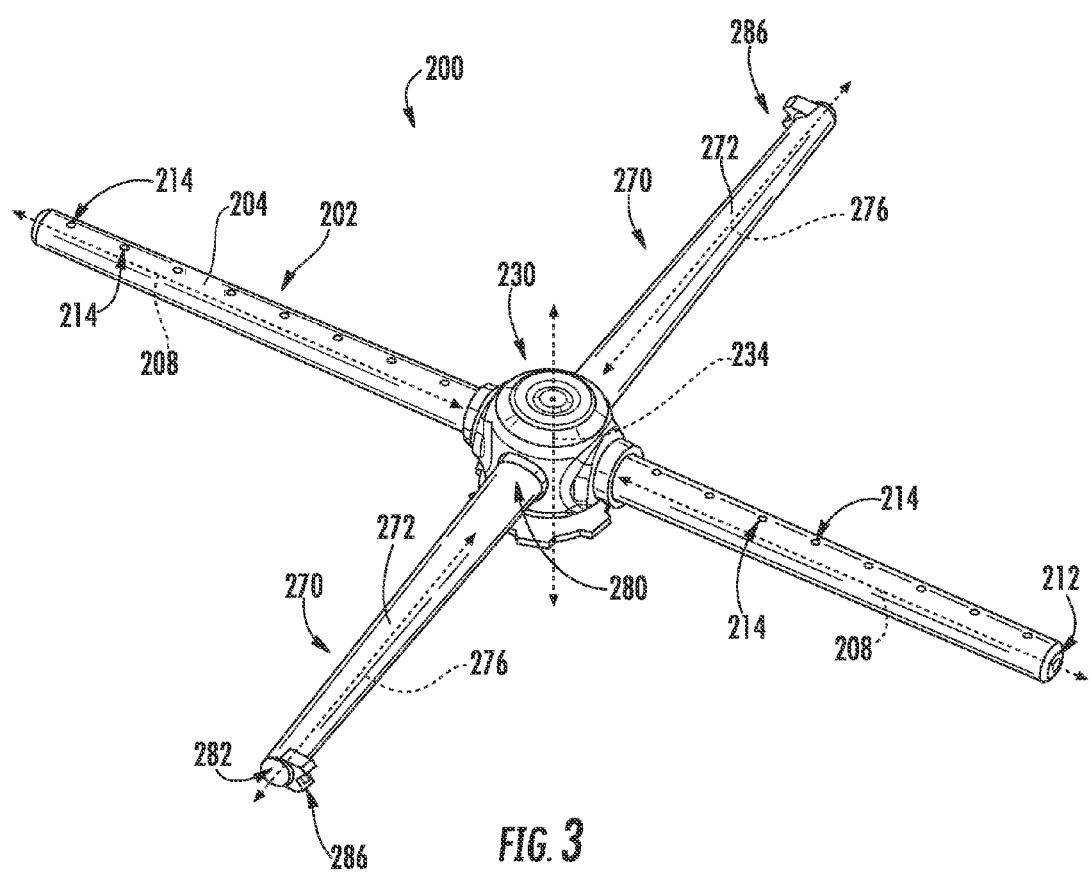
FIG. 3 is a bottom view of a spray arm assembly in accordance with one embodiment of the present disclosure.

FIGS. 1 and 2 depict an exemplary domestic dishwasher or dishwashing appliance 100 that may be configured in accordance with aspects of the present disclosure. For the particular embodiment of FIGS. 1 and 2, the dishwasher 100 includes a cabinet 102 having a tub 104 therein that defines a wash chamber 106. The tub 104 includes a front opening (not shown) and a door 120 hinged at its bottom 122 for movement between a normally closed vertical position (shown in FIGS. 1 and 2), wherein the wash chamber 106 is sealed shut for washing operation, and a horizontal open position for loading and unloading of articles from the dishwasher. Latch 123 is used to lock and unlock door 120 for access to chamber 106.

Upper and lower guide rails 124, 126 are mounted on tub side walls 128 and accommodate roller-equipped rack assemblies 130 and 132. Each of the rack assemblies 130, 132 is fabricated into lattice structures including a plurality of elongated members 134 (for clarity of illustration, not all elongated members making up assemblies 130 and 132 are shown in FIG. 2). Each rack 130, 132 is adapted for movement between an extended loading position (not shown) in which the rack is substantially positioned outside the wash chamber 106, and a retracted position (shown in FIGS. 1 and 2) in which the rack is located inside the wash chamber 106. This is facilitated by rollers 135 and 139, for example, mounted onto racks 130 and 132, respectively. A silverware basket (not shown) may be removably attached to rack assembly 132 for placement of silverware, utensils, and the like, that are otherwise too small to be accommodated by the racks 130, 132.

The dishwasher 100 further includes a lower spray-arm assembly 144 that is rotatably mounted within a lower region 146 of the wash chamber 106 and above a tub sump portion 142 so as to rotate in relatively close proximity to rack assembly 132. A mid-level spray-arm assembly 148 is located in an upper region of the wash chamber 106 and may be located in close proximity to upper rack 130. Additionally, an upper spray assembly 150 may be located above the upper rack 130.

The lower and mid-level spray-arm assemblies 144, 148 and the upper spray assembly 150 are fed by a fluid circulation assembly 152 for circulating water and dishwasher fluid in the tub 104. The fluid circulation assembly 152 may include a pump 154 located in a machinery compartment 140 located below the bottom sump portion 142 of the tub 104, as generally recognized in the art. Each spray-arm assembly 144, 148 includes an arrangement of discharge ports or orifices for directing washing liquid onto dishes or other articles located in rack assemblies 130 and 132. The arrangement of the discharge ports, also referred to as jets or apertures, in spray-arm assemblies 144, 148 provides a rotational force by virtue of washing fluid flowing through the discharge ports. The resultant rotation of the lower spray-arm assembly 144 provides coverage of dishes and other dishwasher contents with a washing spray.

The dishwasher 100 is further equipped with a controller 137 to regulate operation of the dishwasher 100. The controller may include a memory and one or more microprocessors, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor.

The controller 137 may be positioned in a variety of locations throughout dishwasher 100. In the illustrated embodiment, the controller 137 may be located within a control panel area 121 of door 120 as shown. In such an embodiment, input/output ("I/O") signals may be routed between the control system and various operational components of dishwasher 100 along wiring harnesses that may be routed through the bottom 122 of door 120. Typically, the controller 137 includes a user interface panel 136 through which a user may select various operational features and modes and monitor progress of the dishwasher 100. In one embodiment, the user interface 136 may represent a general purpose I/O ("GPIO") device or functional block. In one embodiment, the user interface 136 may include input components, such as one or more of a variety of electrical, mechanical or electro-mechanical input devices including rotary dials, push buttons, and touch pads. The user interface 136 may include a display component, such as a digital or analog display device designed to provide operational feedback to a user. The user interface 136 may be in communication with the controller 137 via one or more signal lines or shared communication busses.

Referring now to FIGS. 3 through 7, various embodiments of a spray arm assembly 200 and drive assembly therefor are illustrated. A spray arm assembly 200 may be utilized in a dishwasher appliance 100, and advantageously may provide increased coverage for wash fluid emitted therefrom within the dishwasher appliance 100.

In exemplary embodiments, the spray arm assembly 200 is a mid-level spray arm assembly 148. Alternatively, the spray arm assembly 200 may be a lower spray arm assembly 144 or may be utilized in the place of an upper spray assembly 150, or may be utilized in any other suitable position within dishwasher appliance 100. The spray arm assembly 200 may generally be in fluid communication with the fluid circulation assembly 152 to receive wash fluid therefrom. The wash fluid is then flowed through the spray arm assembly 200 and exhausted therefrom into the wash chamber 106 during operation of the dishwasher appliance 100, such as during a wash or rinse cycle.

Spray arm assembly 200 may include one or more spray arms. For example, as illustrated, spray arm assembly 200 may include one or more first spray arms 202. Each first spray arm 202 may include an arm member 204. Arm member 204 may define an interior 206. Further, arm member 204 may extend along and define a longitudinal axis 208, and may extend between a base 210 and a tip 212 along the longitudinal axis 208.

Spray arm assembly 200 may further include a central housing 230 that defines an interior 232. The central housing 230 may further define a central axis 234 therethrough, which may for example be generally perpendicular to the longitudinal axis or axes 208 of the arm member(s) 204. Central housing 230 may, for example, be rotatable about the central axis 234.

Housing 230 may be in fluid communication with the fluid circulation assembly 152 to receive wash fluid therefrom. Accordingly, wash fluid may flow into the housing 230 though inlet 236. The wash fluid may then flow from the housing 230 to the various spray arms of the spray arm assembly 200, including for example the first spray arms 202 and second spray arms as discussed herein.

A first spray arm 202 in accordance with the present disclosure may further operate to emit wash fluid therefrom in an improved manner which advantageously increases the wash fluid coverage within the dishwasher appliance 100. For example, arm member 204 may be rotatable about the longitudinal axis 208. Apertures 214 may be defined in the arm member 204 to emit wash fluid therethrough from the interior 206 of the arm member 204. The arm member 204 may, for example, be in fluid communication with the housing 230 such that wash fluid flows from the interior 232 into the interior 206. This wash fluid can then be emitted through the apertures 214 into the wash chamber 106. Rotation of the arm member 204 about the longitudinal axis 208 may cause the apertures 214 to emit wash fluid towards different locations at different times during operation, thus advantageously providing increased wash fluid coverage.

As discussed, arm members 204 in accordance with the present disclosure may be rotatable about their longitudinal axes 208. In exemplary embodiments, a drive assembly 250 may be disposed within the central housing 230. Arm members 204 may extend into the interior 232 of the housing 230, such that the bases 210 are disposed within the housing interior 232. Components of the drive assembly may be mounted to the arm members 204 within the interior 232 to facilitate rotation of the arm members 204 about their longitudinal axes 208. Drive assembly 250 may be configured to rotate the arm member(s) 204 about their longitudinal axes 208. In exemplary embodiments, a drive assembly 250 may be configured to rotate arm member(s) 204 about their longitudinal axes 208 when the central housing 230 rotates about the central axis 234, and due to this rotation.

For example, drive assembly 250 may include a drive member 252 and one or more axle members 254. Each axle member 254 may be mounted to an associated arm member 204. In some embodiments, an axle member 254 may be integral with the associated arm member 206, while in other embodiments the axle member 254 may be a separate component connected to the associated arm member 204 via a suitable adhesive, mechanical fastener, etc. Drive assembly 250 may further include an idler member 256, as shown. Idler member 256 may advantageously provide stability to the drive assembly 250 and reduce binding during operation thereof.

Rotation of an axle member 254 may cause rotation of the associated arm member 204 about its longitudinal axis 208. For example, central housing 230 and the first spray arms 202 and associated axle members 254 may be rotatable about the central axis 234 relative to the drive member 252. Due to the contact between the drive member 252 and axle members 254, this rotation may cause the drive member 252 to drive rotation of the axle members 254 about the associated longitudinal axes 208 of the associated arm members 204, thus causing rotation of the associated arm members 204 about their longitudinal axes 208.

Figure 4:
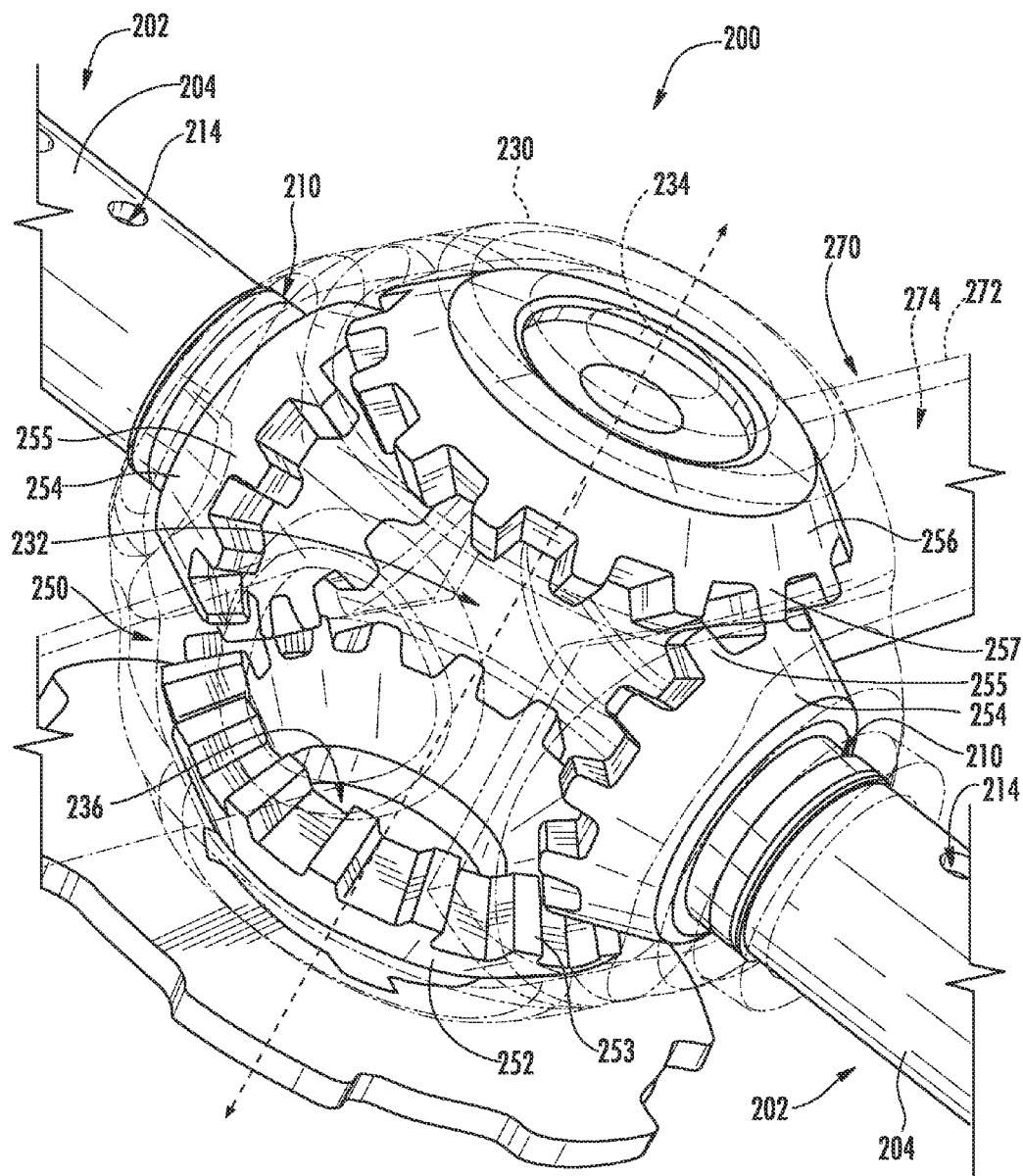
FIG. 4 is a perspective close-up view of central portions of a spray arm assembly, with a central housing and arm members of second spray arms in phantom for illustrative purposes, in accordance with one embodiment of the present disclosure.
Figure 5:
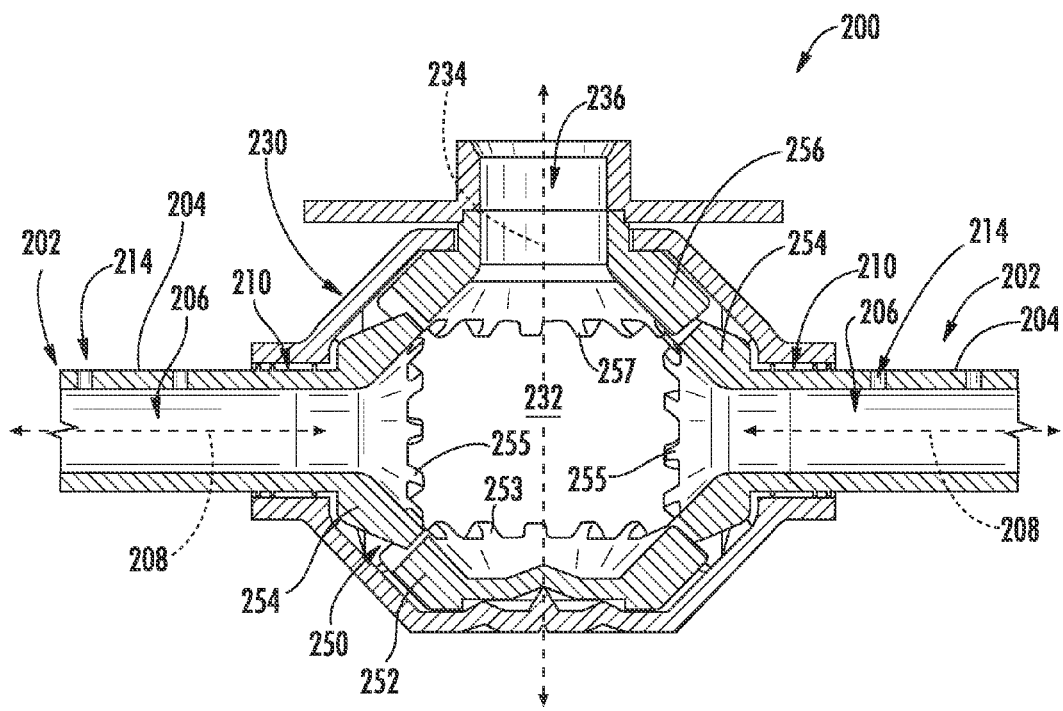
FIG. 5 is a cross-sectional view of central portions of a spray arm assembly, with a central housing and arm members of first spray arms in phantom for illustrative purposes, in accordance with one embodiment of the present disclosure.
Figure 6:
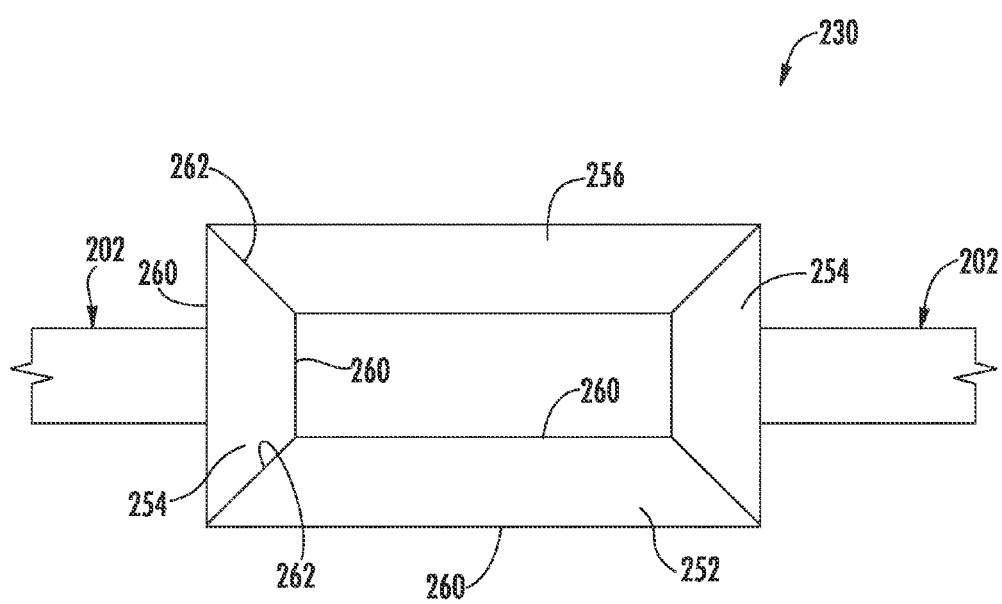
FIG. 6 is a side schematic view of a drive assembly for a spray arm assembly in accordance with another embodiment of the present disclosure.

For example, in some embodiments as illustrated in FIGS. 4 through 6, drive assembly 250 may be a bevel drive assembly 250, with the various members thereof having a bevel-style arrangement. FIGS. 4 and 5 illustrate one embodiment wherein the drive assembly 250 is a bevel gear assembly and the members are gears. Accordingly, drive member 252 is a drive gear 252, axle members 254 are axle gears, and idler member 256 is an idler gear. Gear teeth 253 of the drive gear 252 may mesh with gear teeth 255 of the axle gears 254, and the drive gear 252 may drive the axle gears 254. Gear teeth 257 of the idler gear 256 may mesh with gear teeth 255 of the axle gears 254.

Notably, in some embodiments, the number of gear teeth 255 of an axle gear 254 may be different from the number of gear teeth 253 of a drive gear 252. In exemplary embodiments, the number of gear teeth 255 of an axle gear 254 may be less than the number of gear teeth 253 of a drive gear 252. Alternatively, the number of gear teeth 255 of an axle gear 254 may be more than the number of gear teeth 253 of a drive gear 252. The resulting gear ratio may advantageously cause the location of emitted wash fluid along an outer arm member 214 to be varied for each location of the outer arm member 214 during rotation about the central axis 234, thus advantageously providing increased wash fluid coverage.

FIG. 6 illustrates another embodiment wherein the drive assembly 250 is a roller assembly, in this case a bevel roller assembly, and the members are rollers. Accordingly, drive member 252 is a drive roller 252, axle members 254 are axle rollers, and idler member 256 is an idler roller. Each roller includes opposing face surfaces 260 and an edge surface 262. In the embodiment shown, the edge surface 262 is a beveled edge surface 262, thus being oriented at an angle other than perpendicular to the face surfaces 260. Edge surfaces 262 may further have linear or curvilinear cross-sectional profiles. The angle of the edge surface 262 relative to the face surfaces 260 may be measured by a line through the end points of the cross-sectional profile of the edge surface 262 as viewed for example in FIG. 6. The edge surface 262 of the drive roller 252 may contact and frictionally engage the edge surfaces 262 of the axle rollers 254, and the drive roller 252 may drive the axle rollers 254. The edge surface 262 of the idler roller 256 may contact and frictionally engage the edge surface 262 of the axle roller 254.

In other embodiments, the components of the drive assembly 250 need not be beveled. For example, FIG. 7 illustrates another embodiment wherein the drive assembly 250 is a roller assembly and the members are rollers. Accordingly, drive member 252 is a drive roller 252, axle members 254 are axle rollers, and idler member 256 is an idler roller. Each roller includes opposing face surfaces 260 and an edge surface 262. In the embodiment shown, the edge surface 262 is oriented perpendicular to the face surfaces 260. Edge surfaces 262 may further have linear or curvilinear cross-sectional profiles. The angle of the edge surface 262 relative to the face surfaces 260 may be measured by a line through the end points of the cross-sectional profile of the edge surface 262. Similar to the orientation of the members in bevel-related embodiments, the axle rollers 254 may be oriented generally perpendicularly to the drive roller 252 and the idler roller 254. A face surface 260 of the drive roller 252 may contact and frictionally engage the edge surfaces 262 of the axle rollers 254, and the drive roller 252 may drive the axle rollers 254. A face surface 260 of the idler roller 256 may contact and frictionally engage the edge surface 262 of the axle roller 254.

Notably with respect to embodiments wherein rollers are utilized, in some embodiments as illustrated in FIGS. 6 and 7 a maximum diameter of an axle roller 254 may be different from a maximum diameter of a drive roller 252. In exemplary embodiments as shown, a maximum diameter of an axle roller 254 is less than a maximum diameter of a drive roller 252. Alternatively, a maximum diameter of an axle roller 254 is greater than a maximum diameter of a drive roller 252. The resulting size differential may advantageously cause the location of emitted wash fluid along an arm member 204 to be varied for each location of the arm member 204 during rotation about the central axis 234, thus advantageously providing increased wash fluid coverage.

In embodiments wherein gears are utilized, the gears may be formed from any suitable material, such as a suitable metal or rigid polymer. In embodiments, wherein rollers are utilized, the rollers may be formed from any suitable material. In exemplary embodiments, the rollers may be formed from a suitable elastomeric material or other suitable pliant polymer.

As further illustrated, spray arm assembly 200 may include one or more second spray arms 270. Each second spray arm 270 may include an arm member 272. Arm member 272 may define an interior 274. Further, arm member 272 may extend along and define a longitudinal axis 276, and may extend between a base 280 and a tip 282 along the longitudinal axis 276.

Arm member 272 may, for example, be generally stationary relative to the longitudinal axis 276. For example, the arm member 272, such as the base 280 thereof, may be mounted to the central housing 230. In some embodiments, the arm member 272 may be integral with the central housing 230, while in other embodiments the arm member 272 may be a separate component connected to the central housing 230 via a suitable adhesive, mechanical fastener, etc. Apertures or slots, as discussed herein, may be defined in the arm member 272 to emit wash fluid therethrough from the interior 274 of the arm member 272. The arm member 274 may, for example, be in fluid communication with the central housing 230 such that wash fluid flows from the interior 232 into the interior 274. This wash fluid can then be emitted through the apertures or slots.

In exemplary embodiments as shown, the arm member 272 of a second spray arm 270 may define one or more apertures 286. In particular the apertures 286 may be drive jet apertures 286, which may emit wash fluid at an orientation that drives rotation of the spray arm 270, and thus the central housing 230 and first spray arms 202, about the central axis 232. In exemplary embodiments, as shown, aperture(s) 286 may be disposed proximate the tip 282 of the arm member 272.

First and second spray arms 202, 270 may have any suitable arrangement about central axis 234. For example, in exemplary embodiments when more than one first spray arm 202 is utilized, the spray arms 202 may be arrayed about the central axis 234, such as generally equally spaced apart about the central axis 234. For example, two first spray arms 202 may be spaced approximately 180 degrees apart from each other about the central axis 234, three first spray arms 202 may be spaced approximately 120 degrees apart from each other about the central axis 234, four first spray arms 202 may be spaced approximately 90 degrees apart from each other about the central axis 234, etc. Similarly, in exemplary embodiments when more than one second spray arm 270 is utilized, the spray arms 270 may be arrayed about the central axis 234, such as generally equally spaced apart about the central axis 234. For example, two second spray arms 270 may be spaced approximately 180 degrees apart from each other about the central axis 234, three second spray arms 270 may be spaced approximately 120 degrees apart from each other about the central axis 234, four second spray arms 270 may be spaced approximately 90 degrees apart from each other about the central axis 234, etc. Additionally, in exemplary embodiments wherein both first and second spray arms 202, 270 are utilized, all spray arms 202, 270 may be arrayed about the central axis 234, such as generally equally spaced apart about the central axis 234. Further, in exemplary embodiments wherein both first and second spray arms 202, 270 are utilized, the arms 202, 270 may for example be arrayed in an alternating manner about the central axis 234.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A spray arm assembly for a dishwasher appliance having a wash chamber, the spray arm assembly comprising:
   a first spray arm comprising an outer surface, the first spray arm defining an interior and a plurality of apertures in fluid communication with the interior and through the outer surface such that a fluid within the interior is emitted from each of the plurality of apertures directly into the wash chamber, the first spray arm further extending along and rotatable about a longitudinal axis such that the outer surface rotates about the longitudinal axis;
   a central housing defining and rotatable about a central axis, the central axis generally perpendicular to the longitudinal axis;
   a second spray arm spaced apart from the first spray arm about the central axis, the second spray arm extending along the longitudinal axis and stationary about the longitudinal axis; and
   a bevel drive assembly disposed within the central housing, the bevel drive assembly comprising a drive member, an axle member, and an idler member, the axle member mounted to the arm member, wherein rotation of the first spray arm is caused by rotation of an axle member about the longitudinal axis and rotation of the axle member about the longitudinal axis is caused by emission of fluid from an interior of the second spray arm, and wherein the drive member and the idler member are symmetrically oriented about the longitudinal axis.

2. The spray arm assembly of claim 1, wherein the first spray arm extends into an interior of the central housing.

3. The spray arm assembly of claim 1, wherein the interior of the first spray arm is in fluid communication with an interior of the central housing.

4. The spray arm assembly of claim 1, wherein the bevel drive assembly is a bevel gear assembly, and wherein the drive member is a drive gear, the axle member is an axle gear, and the idler member is an idler gear.

5. The spray arm assembly of claim 4, wherein the number of gear teeth of the axle gear is less than the number of gear teeth of the drive gear.

6. The spray arm assembly of claim 1, wherein the first spray arm is a plurality of first spray arms.

7. The spray arm assembly of claim 1, wherein the second spray arm includes a base and a tip, the base and tip spaced apart from one another along the longitudinal direction, the base mounted to the central housing.

8. The spray arm assembly of claim 7, wherein the second spray arm defines an interior and an aperture in fluid communication with the interior, and wherein the aperture is disposed proximate the tip such that a fluid within the interior is emitted from the aperture to drive rotation of the first spray arm, the second spray arm, and the central housing about the central axis.

9. A spray arm assembly for a dishwasher appliance having a wash chamber, the spray arm assembly comprising:
   a first spray arm comprising an outer surface, the first spray arm defining an interior and a plurality of apertures in fluid communication with the interior and through the outer surface such that a fluid within the interior is emitted from each of the plurality of apertures directly into the wash chamber, the first spray arm further extending along and rotatable about a longitudinal axis such that the outer surface rotates about the longitudinal axis;
   a central housing defining and rotatable about a central axis, the central axis generally perpendicular to the longitudinal axis; and
   a bevel drive assembly disposed within the central housing, the bevel drive assembly configured to rotate the first spray arm about the longitudinal axis when the central housing rotates about the central axis, the bevel drive assembly comprising a drive member, an axle member, and an idler member, the axle member mounted to the arm member, wherein the drive member and the idler member are symmetrically oriented about the longitudinal axis.

10. The spray arm assembly of claim 9, wherein the first spray arm extends into an interior of the central housing.

11. The spray arm assembly of claim 9, wherein the interior of the first spray arm is in fluid communication with an interior of the central housing.

12. The spray arm assembly of claim 9, wherein the bevel drive assembly is a bevel gear assembly, and wherein the drive member is a drive gear, the axle member is an axle gear, and the idler member is an idler gear.

13. The spray arm assembly of claim 12, wherein the number of gear teeth of the axle gear is less than the number of gear teeth of the drive gear.

14. The spray arm assembly of claim 9, wherein the first spray arm is a plurality of first spray arms.

* * * * *